United States Patent
Keremane et al.

(10) Patent No.: US 9,952,951 B2
(45) Date of Patent: Apr. 24, 2018

(54) PRESERVING COREDUMP DATA DURING SWITCHOVER OPERATION

(71) Applicant: NetApp Inc., Sunnyvale, CA (US)

(72) Inventors: Hrishikesh Keremane, Sunnyvale, CA (US); Sravana Kumar Elpula, Santa Clara, CA (US); Vijay Singh, San Jose, CA (US); Kalaivani Arumugham, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 168 days.

(21) Appl. No.: 14/920,275

(22) Filed: Oct. 22, 2015

(65) Prior Publication Data

US 2017/0116096 A1    Apr. 27, 2017

(51) Int. Cl.
    *G06F 11/20*    (2006.01)
(52) U.S. Cl.
    CPC ...... *G06F 11/2071* (2013.01); *G06F 11/2069* (2013.01); *G06F 11/2092* (2013.01); *G06F 11/2097* (2013.01); *G06F 2201/805* (2013.01)
(58) Field of Classification Search
    CPC ............. G06F 11/2069; G06F 11/2071; G06F 11/2092; G06F 11/2097
    See application file for complete search history.

(56) References Cited

U.S. PATENT DOCUMENTS

| | | | | |
|---|---|---|---|---|
| 5,928,367 A | * | 7/1999 | Nelson | G06F 11/1666 714/6.3 |
| 8,412,672 B1 | * | 4/2013 | Radhakrishnan | H04L 67/1097 707/609 |
| 9,836,368 B2 | * | 12/2017 | Keremane | G06F 11/2069 |
| 2005/0177770 A1 | * | 8/2005 | Coatney | G06F 11/2092 714/15 |
| 2012/0023309 A1 | * | 1/2012 | Abraham | G06F 11/00 712/30 |

(Continued)

OTHER PUBLICATIONS

Data ONTAP 8.2. 2013. NetApp [retrieved on Sep. 28, 2017]. Retrieved from the Internet: <URL:https://library.netapp.com/ecmdocs/ECMP1196817/html/storage/failover/mailbox-disk/show.html>.*

(Continued)

*Primary Examiner* — Paul F Contino
(74) *Attorney, Agent, or Firm* — Cooper Legal Group, LLC (57) ABSTRACT

One or more techniques and/or computing devices are provided for preserving coredump data. A first storage controller, of a first storage cluster, may have a disaster recovery relationship with a second storage controller of a second storage cluster. When the first storage controller fails, the first storage controller performs a coredump process to dump memory contents of the first storage controller into a storage device. During implementation of the coredump process, the first storage controller stores a storage device identifier of the storage device into a disk mailbox. Upon detecting the failure, the second storage controller reads the storage device identifier from the disk mailbox. The second storage controller performs a switchover operation to change ownership of storage devices, but excluding the storage device used by the coredump process, from the first storage controller to the second storage controller for providing clients with failover access to the storage devices.

20 Claims, 9 Drawing Sheets

(56) References Cited

U.S. PATENT DOCUMENTS

| | | | |
|---|---|---|---|
| 2013/0067569 A1* | 3/2013 | Rizzo | G06F 13/12 726/21 |
| 2014/0258608 A1* | 9/2014 | Viswanatha | G06F 12/0873 711/113 |
| 2016/0154701 A1* | 6/2016 | Desai | G06F 11/1438 714/19 |

OTHER PUBLICATIONS

Replacing a Controller Module in a 2240 System. NetApp. 2011.*

* cited by examiner

PRESERVING COREDUMP DATA DURING SWITCHOVER OPERATION

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with access to data stored within a second storage device (e.g., failover access to replicated data within the second storage device) and/or other storage devices (e.g., primary access to data stored within a third storage device). The first storage controller and the second storage controller may be configured according to a disaster recovery relationship, such that the second storage controller may provide failover access to replicated data that was replicated from the first storage device to the second storage device (e.g., a switchover operation may be performed where the second storage controller assumes ownership of the second storage device and/or other storage devices previously owned by the first storage controller so that the second storage controller may provide clients with failover access to data within such storage devices). Once the first storage controller recovers, a switchback operation may be performed to return ownership of the storage devices back to the first storage controller so that the first storage controller can provide clients with primary access to data within the storage controllers.

In an example where the failure corresponds to a software failure (e.g., a controller panic), the first storage controller may perform a coredump process to dump memory content of the first storage controller into a storage device. The dumped memory content may be extracted, such as extraction of a coredump file, for debugging the software failure. Unfortunately, the second storage controller may not have knowledge of which storage device is used by the coredump process. Thus, when the second storage controller takes ownership of the storage devices of the first storage controller during the switchover operation, the second storage controller may switch ownership of the storage device being used by the coredump process, which can abort the coredump process resulting in a loss of the dumped memory content that could otherwise be used for diagnostics. The second storage controller may wait a set amount of time before performing the switchover to allow the coredump process to complete, however, clients may be unable to access data until after the switchover and thus disruptive client access to data may result. The first storage controller may attempt to send a device identifier of the storage device, used for the coredump process, to the second storage controller, however, the first storage controller may be unable to send the device identifier due to the software failure, unavailability of a network, etc. Thus, either the coredump process is aborted from the switchover or the switchover is delayed thus resulting in disruptive client access to data.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for coredump data preservation are provided. For example, a first storage controller, of a first storage cluster, may perform a coredump process of memory contents into a storage device responsive to a failure of the first storage controller. While implementing the coredump process, the first storage controller may store, into a disk mailbox, a storage device identifier of the storage device that may have been chosen by the first storage controller as a target storage device for the coredump process (e.g., because storage devices may be added or removed from the first storage cluster, the first storage controller may select the storage device during implementation of the coredump process). For example, the first storage controller may store the storage device identifier while in a single threaded mode without perform a context switch, such as by storing the storage device identifier inline during implementation of the coredump process, because the first storage controller may be in a kernel panic mode where context switching is unavailable. A second storage controller, within a second storage cluster, may be a disaster recovery partner for the first storage controller. Response to the second storage controller determining that the first storage controller is experiencing the failure, the second storage controller may read the storage device identifier from the disk mailbox (e.g., by performing a raw read operation because the disk mailbox may be hosted within a second storage controller owned by the first storage controller but not owned by the second storage controller). In this way, the second storage controller may perform the switchover operation of storage devices owned by the first storage controller, but excluding the storage device used by the coredump process, to provide clients with failover access to data within the switched over storage devices without aborting the coredump process. In this way, coredump data is preserved for diagnostics.

Figure 1:
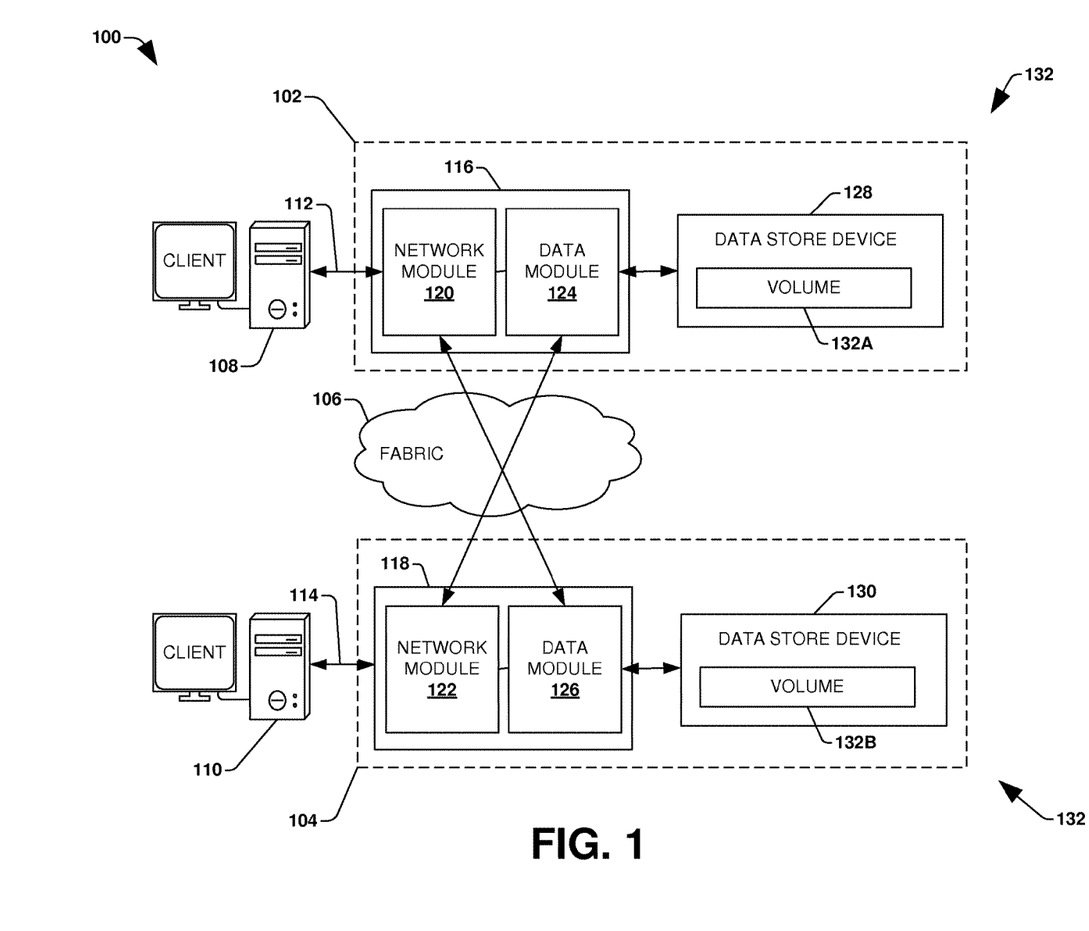
FIG. 1 is a component block diagram illustrating an example clustered network in accordance with one or more of the provisions set forth herein.

To provide context for coredump data preservation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that preserving coredump data may be implemented within the clustered network environment 100. In an example, the node 116 (e.g., a first storage controller) may experience a failure, and thus may implement a coredump process to dump memory content of the node 116 into a storage device. During implementation of the coredump process, the node 116 may write a storage device identifier, of the storage device, into a disk mailbox. The node 118 (e.g., a second storage controller) may identify the failure of the node 116, and may read the storage device identifier from the disk mailbox. The node 118 may perform a switchover operation of storage devices owned by the node 116, but excluding the storage device identified by the storage device identifier, for providing clients with failover access to data. It may be appreciated that preserving coredump data may be implemented for and/or between any type of computing environment, and may be transferrable between physical devices (e.g., node 116, node 118, etc.) and/or a cloud computing environment (e.g., remote to the clustered network environment 100).

Figure 2:
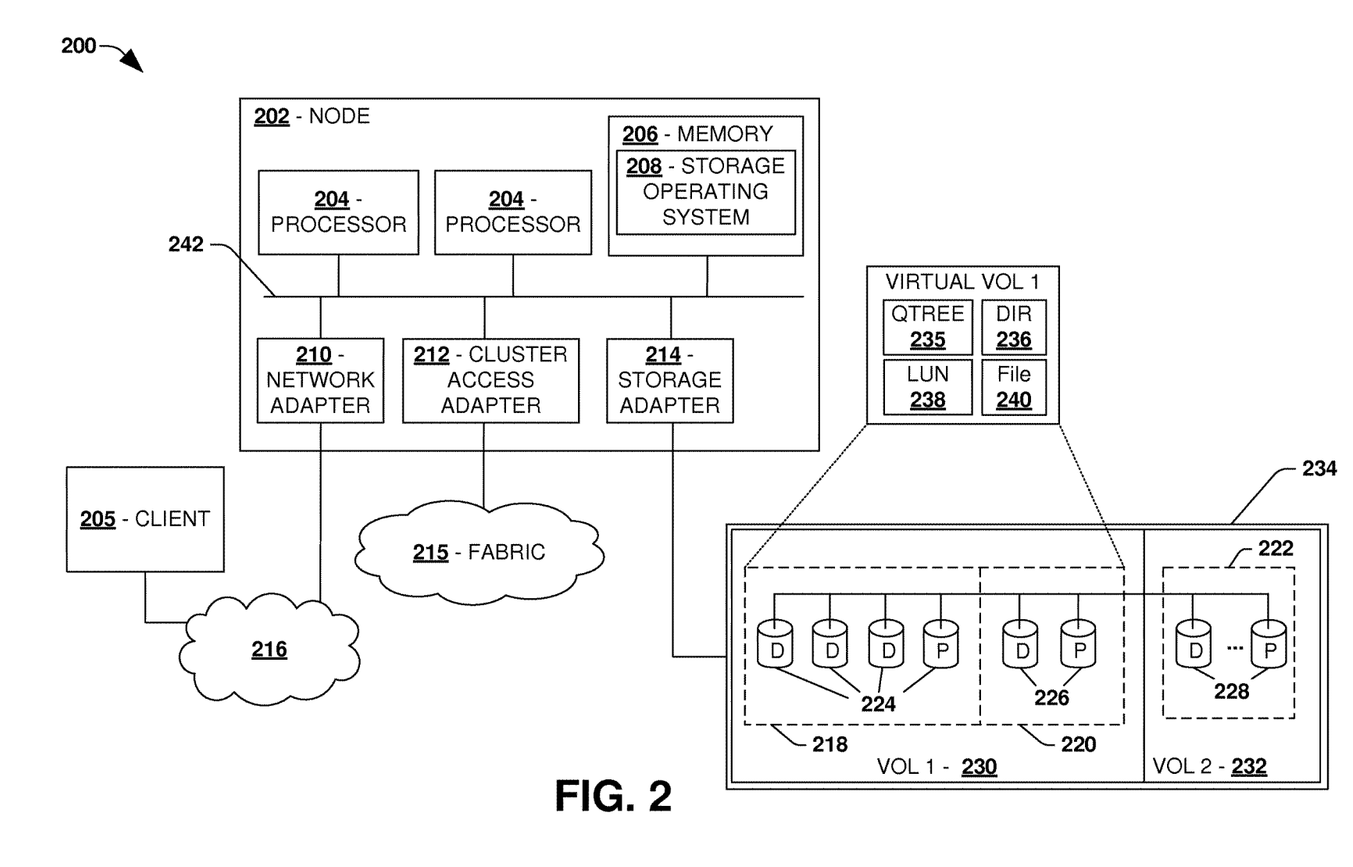
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that preserving coredump data may be implemented for the data storage system 200. In an example, the node 202 (e.g., a first storage controller) may experience a failure, and thus may implement a coredump process to dump memory content of the node 202 into a storage device. During implementation of the coredump process, the node 202 may write a storage device identifier, of the storage device, into a disk mailbox. A second node (e.g., a second storage controller) may identify the failure of the node 202, and may read the storage device identifier from the disk mailbox. The second node may perform a switchover operation of storage devices owned by the node 202, but excluding the storage device identified by the storage device identifier, for providing clients with failover access to data. It may be appreciated that preserving coredump data may be implemented for and/or between any type of computing environment, and may be transferrable between physical devices (e.g., node 202, host 205, etc.) and/or a cloud computing environment (e.g., remote to the node 202 and/or the host 205).

Figure 3:
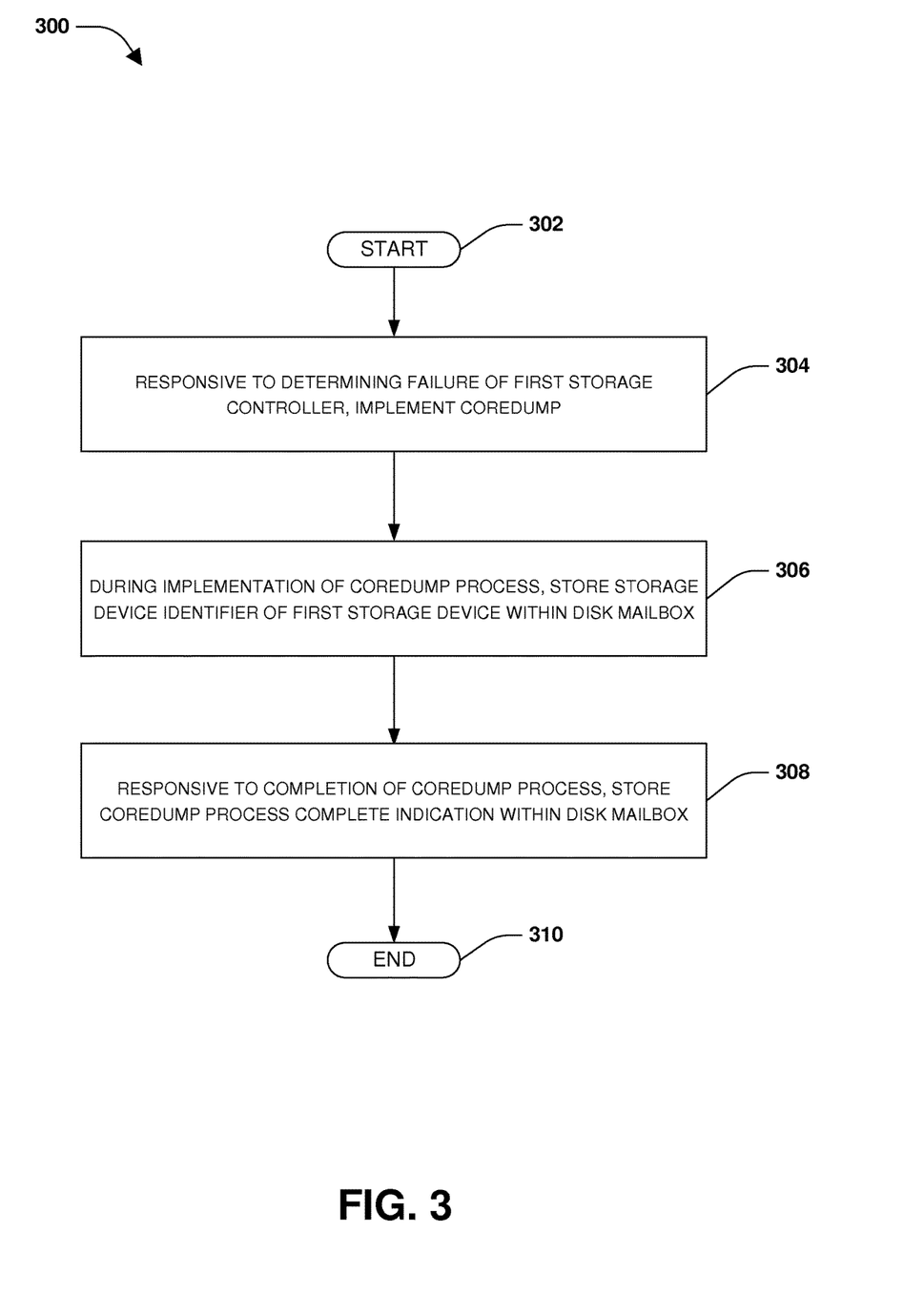
FIG. 3 is a flow chart illustrating an exemplary method of preserving coredump data, where a first storage controller stores a storage device identifier of a storage device used by the first storage controller for a coredump process.

One embodiment of preserving coredump data is illustrated by an exemplary method 300 of FIG. 3. A first storage cluster may comprise a first storage controller configured to provide clients with access to data within one or more storage devices owned by the first storage controller. A second storage cluster may comprise a second storage controller configured as a disaster recovery partner for the first storage controller, such that the second storage controller may perform a switchover operation from the first storage controller to the second storage controller to provide clients with failover access to data within the one or more storage devices (e.g., the switchover operation may reassign ownership of the one or more storage devices to the second storage controller so that the second storage controller may provide clients with access to the one or more storage devices while the first storage controller is unavailable due to the failure).

At 302, the method 300 starts. At 304, responsive to determining a failure of the first storage controller (e.g., a software failure such as a kernel panic), a coredump process may be implemented by the first storage controller to dump memory content of the first storage controller into a first storage device. Because storage devices may be added to or removed from the first storage cluster, the first storage controller may dynamically select the first storage device in response to the failure. Thus, the first storage controller may not pre-emptively know what storage device to use, and thus may be unable to pre-emptively notify the second storage controller of such.

At 306, during implementation of the coredump process, a storage device identifier of the first storage device may be stored by the first storage controller within a disk mailbox owned by the first storage controller and accessible to the second storage controller (e.g., because the second storage controller may not own a second storage device comprising the disk mailbox, the second storage controller may merely perform raw read operations to the disk mailbox to obtain the storage device identifier). The storage device identifier may specify (e.g., by virtue of being stored and available through the disk mailbox to the second storage controller) that ownership of the first storage device is not to be acquired by the second storage controller during a switchover operation (e.g., until completion of the coredump process) of one or more storage devices, owned by the first storage controller, to the second storage controller for providing clients with failover access to data associated with the one or more storage devices switched over to the second storage controller.

In an example, the first storage controller may write the storage device identifier while in a single threaded mode (e.g., the first storage controller may enter the single threaded mode upon experiencing a kernel panic failure). In another example, the first storage controller may write the storage device identifier without performing a context switch (e.g., the first storage controller may be unable to perform context switching while in the single threaded mode). In another example, the first storage controller may write the storage device identifier inline during implementation of the coredump process. In another example, the first storage controller may store the storage device identifier within the disk mailbox based upon a determination of unreliable network interconnectivity between the first storage controller and the second storage controller because the first storage controller would otherwise be unable to reliably transmit the storage device identifier over a network to the second storage controller, and thus utilization of the disk mailbox may be more reliable.

In this way, the second storage controller may perform a switchover operation that excludes the first storage device based upon the storage device identifier indicating that the first storage device is being used by the coredump process. Because the switchover operation excludes the first storage device, the coredump process may be able to complete without being aborted by the second storage controller otherwise taking ownership of the first storage device before completion of the coredump process. The switchover operation may be implemented before completion of the coredump process, thus the second storage controller may provide clients with failover access to data within storage devices switched over from ownership by the first storage controller to ownership by the second storage controller sooner than if the switchover operation waited for completion of the coredump process. At 308, responsive to completion of the coredump process, the first storage controller may store a coredump process complete indication within the disk mailbox. Upon the second storage controller identifying the coredump process complete indication, the second storage controller may acquire ownership of the first storage device for extracting coredump data for diagnosing the failure. At 310, the method 300 ends.

Figure 4:
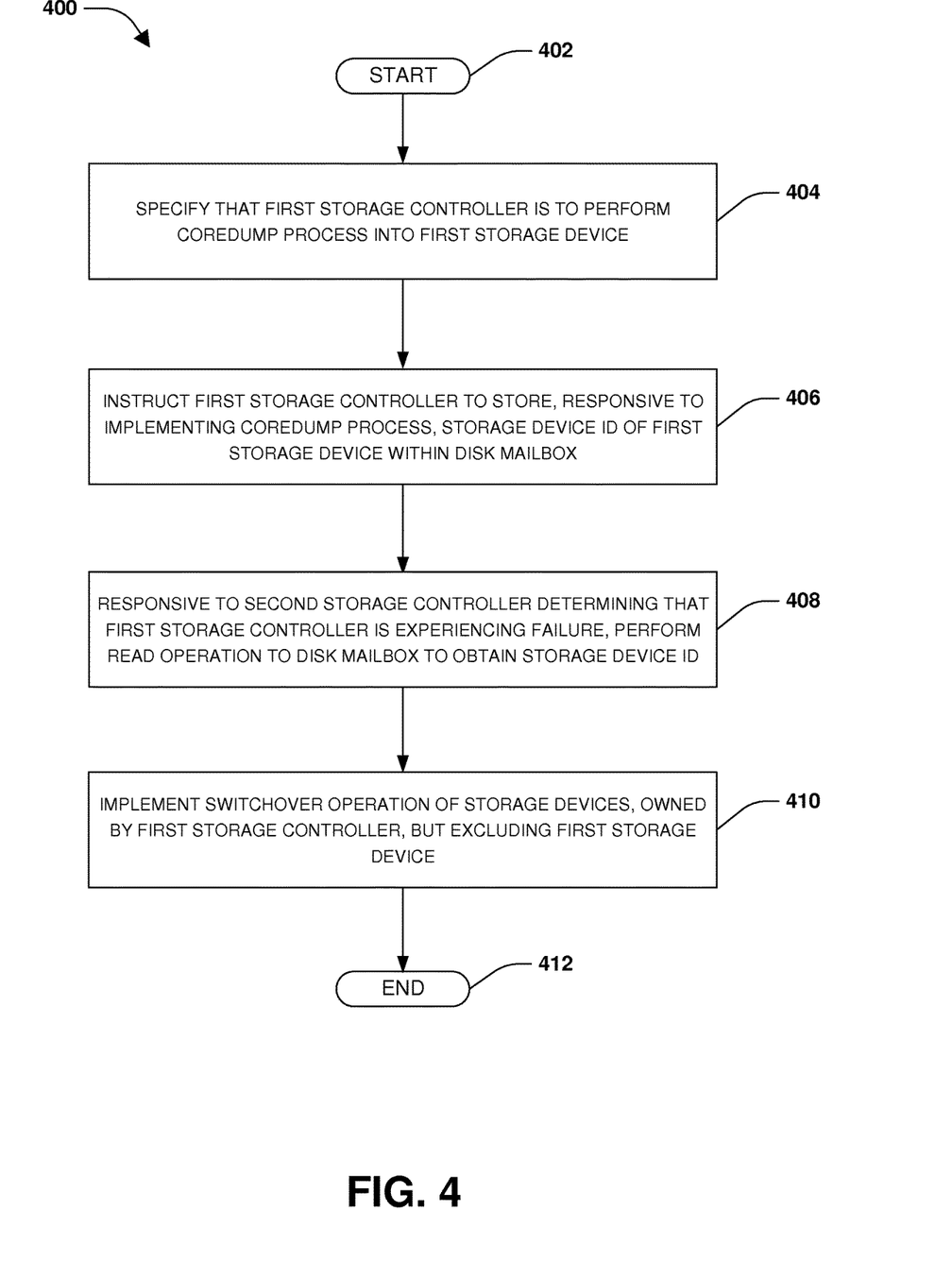
FIG. 4 is a flow chart illustrating an exemplary method of preserving coredump data, where a second storage controller performs a switchover operation.

One embodiment of preserving coredump data is illustrated by an exemplary method 400 of FIG. 4. A first storage cluster may comprise a first storage controller configured to provide clients with access to data within one or more storage devices owned by the first storage controller. A second storage cluster may comprise a second storage controller configured as a disaster recovery partner for the first storage controller, such that the second storage controller may perform a switchover operation from the first storage controller to the second storage controller to provide clients with failover access to data within the one or more storage devices (e.g., the switchover operation may reassign the one or more storage devices to the second storage controller so that the second storage controller may provide clients with access to the one or more storage devices while the first storage controller is unavailable due to the failure).

At 402, the method 400 starts. At 404, a coredump process, used by the first storage controller to dump memory content of the first storage controller, may be specified to be performed into a first storage device upon a failure of the first storage controller. In an example, the first storage device may be selected for use by the coredump process by the first storage controller in response to identifying the failure (e.g., the first storage controller may have a kernel panic or other software failure). At 406, the first storage controller may be instructed to store, responsive to implementing the coredump process, a storage device identifier of the first storage device within a disk mailbox owned by the first storage controller and accessible to the second storage controller (e.g., because the second storage controller may not own a second storage device comprising the disk mailbox, the second storage controller may merely have access to perform raw read operations to obtain the storage device identifier). In an example, the storage device identifier may be stored within the disk mailbox while the first storage controller is in a single threaded mode implementing the coredump process without the ability to perform context switching. Because network interconnectivity may be lacking between the first storage controller and the second storage controller, the first storage controller may store the storage device identifier within the disk mailbox instead of attempting to transmit the storage device identifier over a network, which may be unreliable.

The second storage controller may be configured as a disaster recovery partner for the first storage controller, such that the second storage controller may perform, responsive to the first storage controller failing, a switchover operation to provide clients with failover access to data previously provided through the first storage controller. At 408, responsive to the second storage controller determining that the first storage controller is experiencing the failure, a read operation (e.g., a raw read operation that does not disrupt the coredump process) may be performing to the disk mailbox to obtain the storage device identifier.

At 410, the switchover operation of one or more storage devices, owned by the first storage controller, to the second storage controller may be implemented for providing clients with failover access to data associated with the one or more storage devices switched over to the second storage controller. The switchover operation is implemented to exclude switching ownership of the first storage device, used for the coredump process, from the first storage controller to the second storage controller based upon the storage device identifier indicating that the first storage device is used for the coredump process. In this way, the switchover operation may be implemented without waiting for completion of the coredump process, and the coredump process may complete without being aborted because the first storage controller retains ownership of the first storage device.

In an example, the second storage controller may periodically check the disk mailbox to determine whether the coredump process is complete (e.g., in response to completing the coredump process, the first storage controller may store a coredump process complete indication within the disk mailbox). For example, a second read operation may be performed to the disk mailbox to determine whether the coredump process is complete. Responsive to the second read operation indicating that the coredump process is complete, the second storage controller may obtain ownership of the first storage device to extract coredump data for diagnosing the failure. Responsive to a threshold number of read operations indicating that the coredump process is not complete, the second storage controller may indicate that the first storage controller is to maintain ownership of the first storage device for subsequent diagnosis of coredump data after recovery of the first storage controller. At 412, the method 400 ends.

Figure 5A:
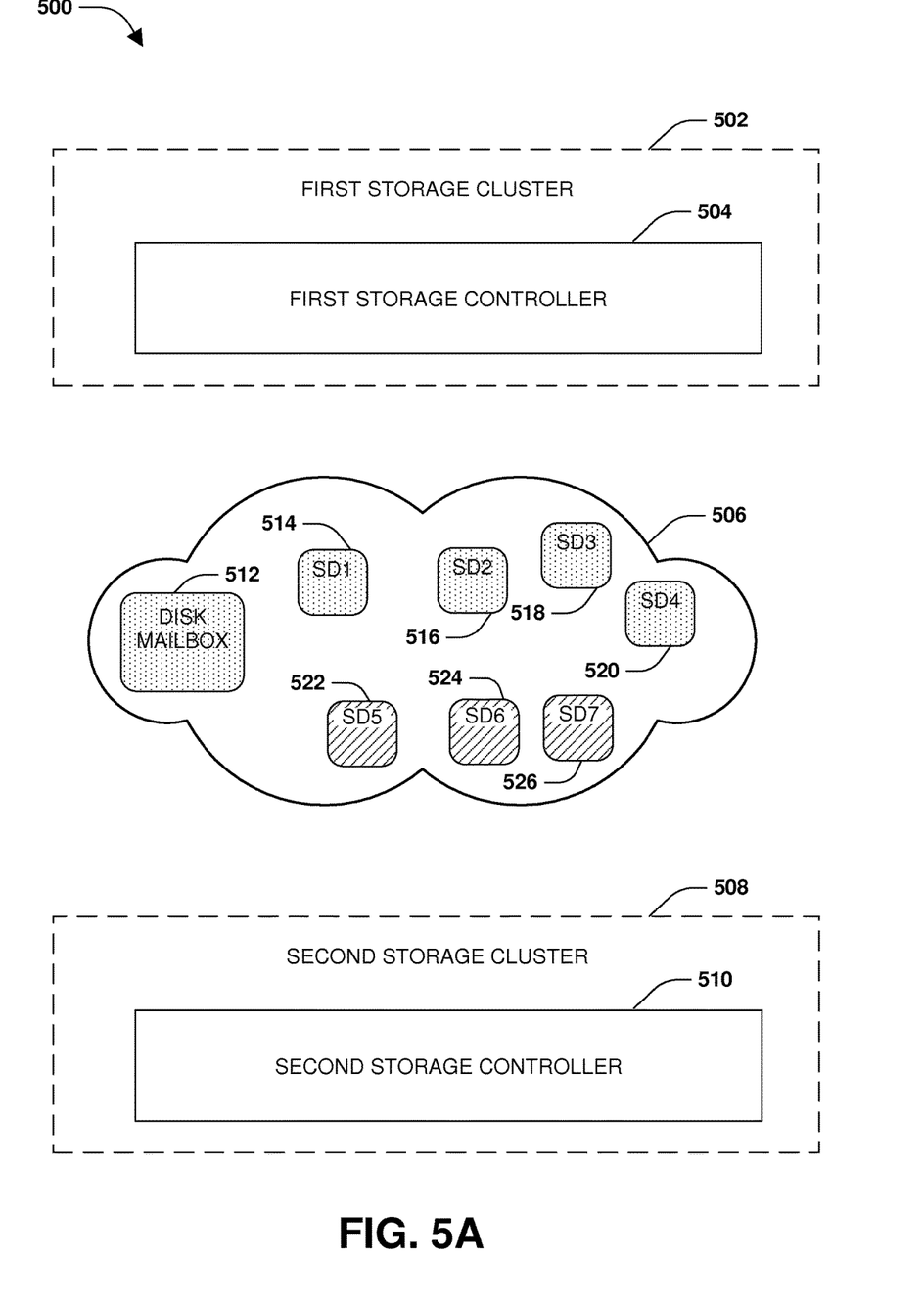
FIG. 5A is a component block diagram illustrating an exemplary computing device for preserving coredump data.

FIGS. 5A-5D illustrate examples of a system 500 for preserving coredump data. FIG. 5A illustrates a first storage cluster 502 comprising a first storage controller 504 and a second storage cluster 508 comprising a second storage controller 510. The first storage cluster 502 and the second storage cluster 508 may be connected by a network 506. The first storage controller 504 may own a first storage device 514, a second storage device 516, a third storage device 518, a fourth storage device 520, and a disk mailbox 512, where ownership by the first storage controller 504 is illustrated by a dotted fill. The first storage controller 504 may provide clients with primary access to data within at least some of the storage devices owned by the first storage controller 504 and/or may replicate data to other storage devices owned by the first storage controller 504 (e.g., data may be replicated to storage devices hosted at the second storage cluster 508, but owned by the first storage controller 504, for data loss protection in the event a disaster occurs at the first storage cluster 502).

The second storage controller 510 may own a fifth storage device 522, a sixth storage device 524, and a seventh storage device 526, where ownership by the second storage controller 510 is illustrated by a diagonal line fill. The second storage controller 510 may provide clients with primary access to data within at least some of the storage devices owned by the second storage controller 510 and/or may replicate data to other storage devices owned by the second storage controller 510 (e.g., data may be replicated to storage devices hosted at the first storage cluster 502, but owned by the second storage controller 510, for data loss protection in the event a disaster occurs at the second storage cluster 508).

Figure 5B:
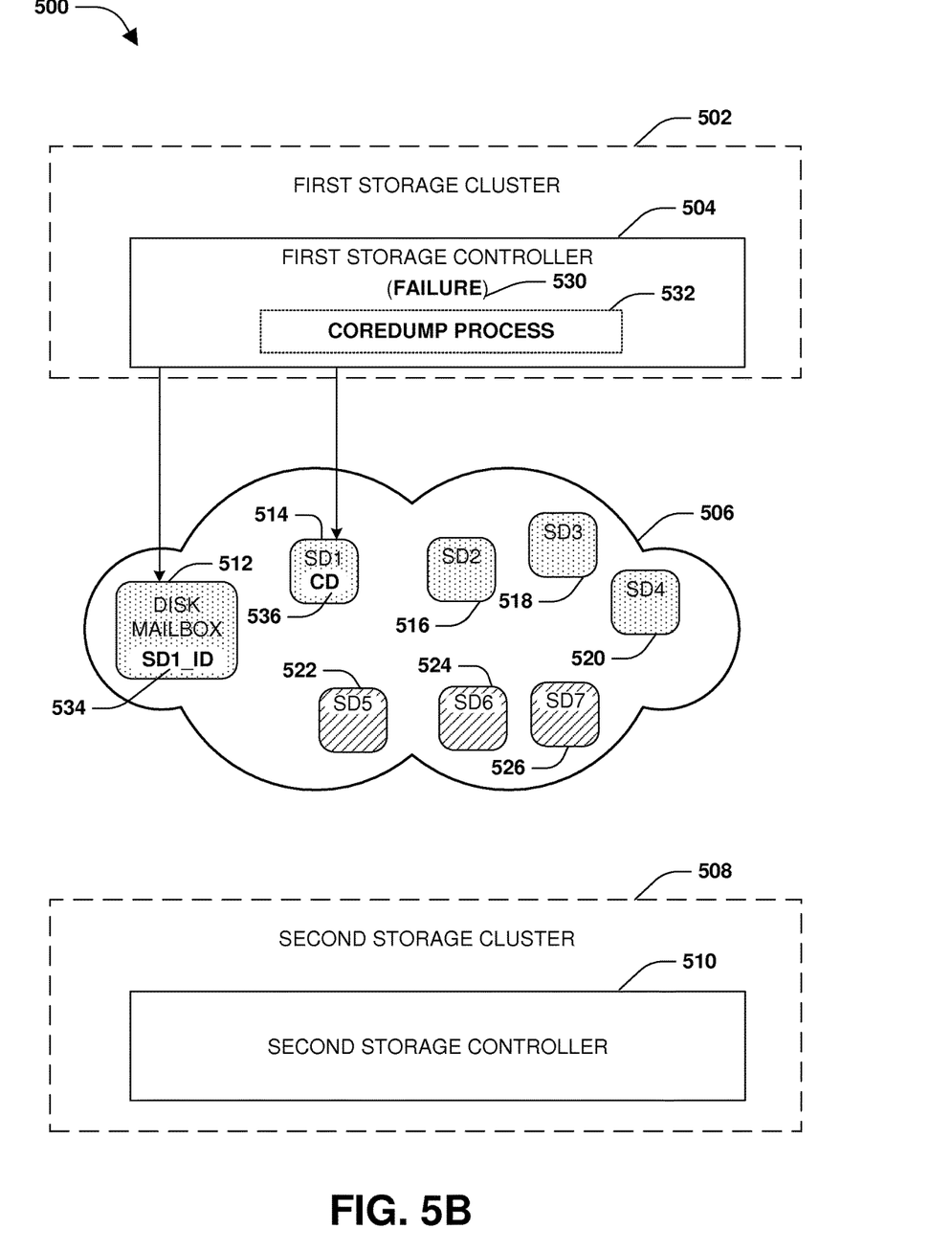
FIG. 5B is a component block diagram illustrating an exemplary computing device for preserving coredump data, where a first storage controller stores a storage device identifier within a disk mailbox.

FIG. 5B illustrates an example of the first storage controller 504 experiencing a failure 530. The first storage controller 504 may select the first storage device 514 for performing a coredump process 532 to dump memory content of the first storage controller 504 into the first storage device 514 as coredump data 536. In an example, network interconnectivity, through the network 506, between the first storage controller 504 and the second storage controller 510 may be unreliable, and thus the first storage controller 504 may refrain from sending a storage device identifier 534 of the first storage device 514 to the second storage controller 510 to indicate that the coredump process 532 is utilizing the first storage device 514 and thus should not be taken over by the second storage controller 510 during a switchover operation performed in response to the failure 530. Accordingly, the first storage controller 504 may store the storage device identifier 534 within the disk mailbox 512.

Figure 5C:
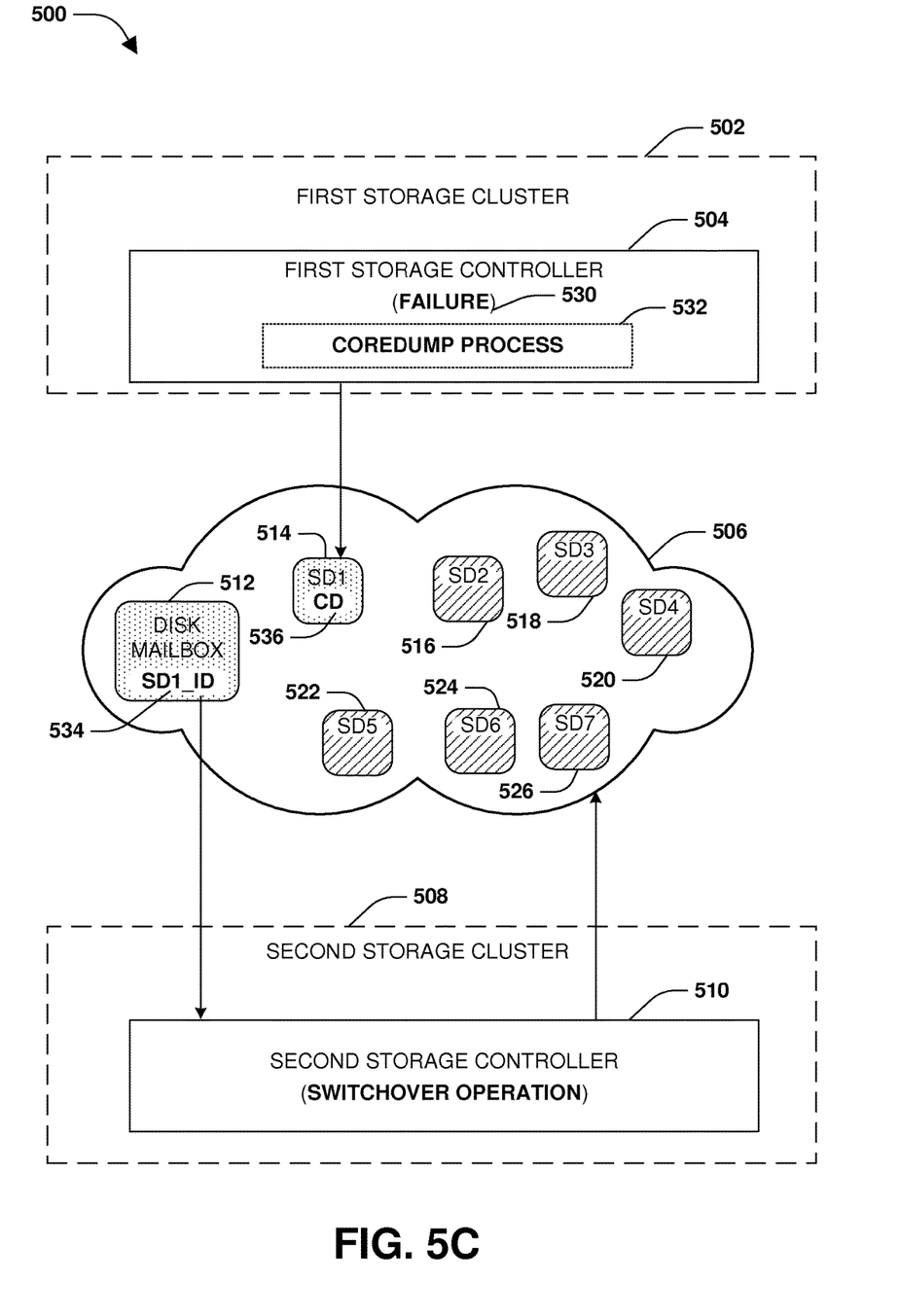
FIG. 5C is a component block diagram illustrating an exemplary computing device for preserving coredump data, where a second storage controller performs a switchover operation.

FIG. 5C illustrates the second storage controller 510 implementing the switchover operation in response to the first storage controller 504 failing 530 (e.g., a detected loss of a heartbeat from the first storage controller 504). The second storage controller 510 may read the storage device identifier 534 from the disk mailbox 512 to determine that the first storage device 514 is being used by the coredump process 532 and thus should not be taken over by the switchover operation. Accordingly, the second storage controller 510 may switchover ownership of the second storage device 516, the third storage device 518, and the fourth storage device 520, but not the first storage device 514, from the first storage controller 504 to the second storage controller 510, where the change into ownership of storage devices to the second storage controller 510 is illustrated by the diagonal line fill. In this way, the second storage controller 510 may provide clients with access to the second storage device 516, the third storage device 518, and/or the fourth storage device 520.

Figure 5D:
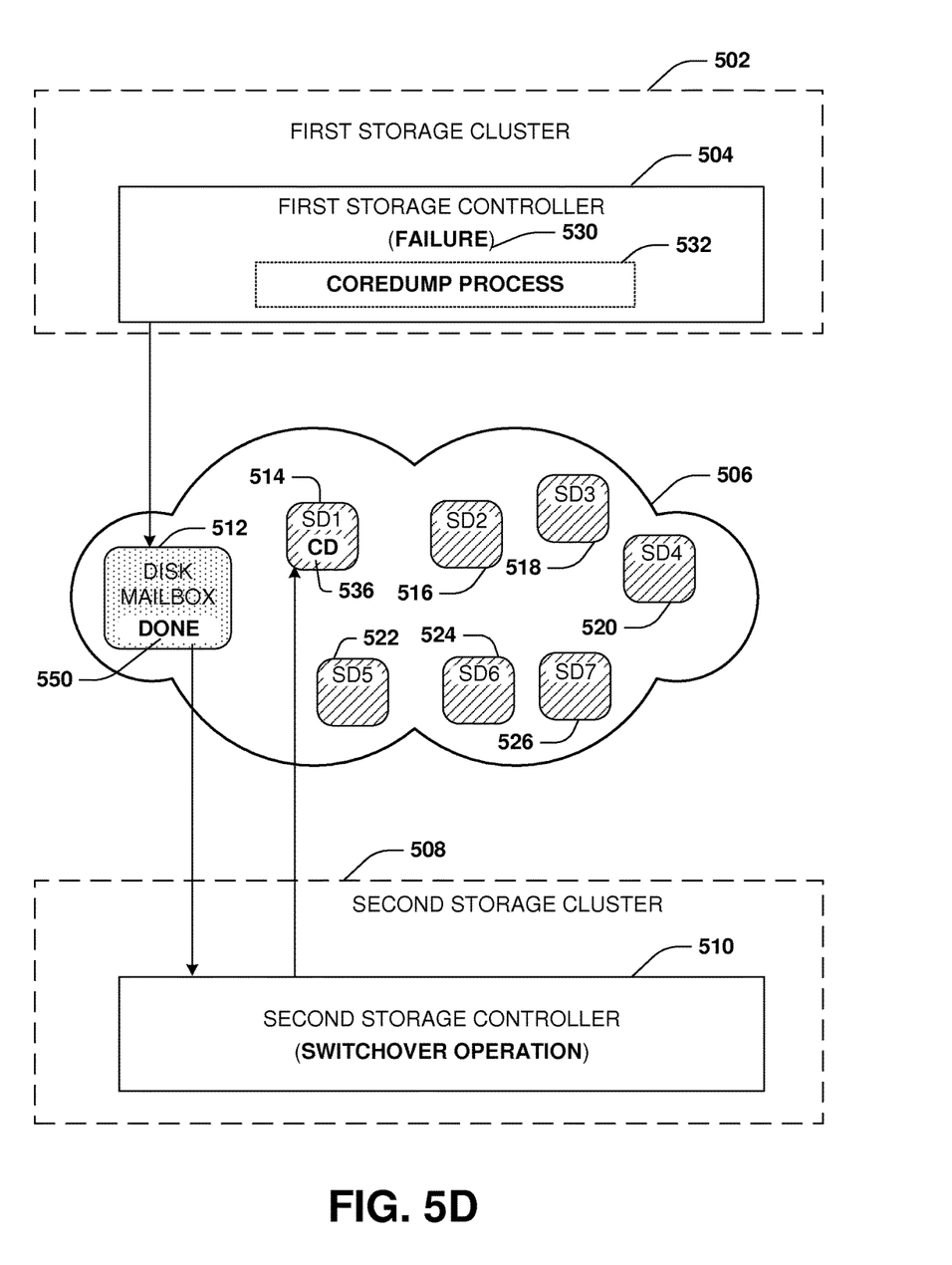
FIG. 5D is a component block diagram illustrating an exemplary computing device for preserving coredump data, where a second storage controller acquires ownership of a first storage device after completion of a coredump process.

FIG. 5D illustrates the coredump process 532 completing. Responsive to completion of the coredump process 532, the first storage controller 504 may store a coredump process complete indication 550 within the disk mailbox 512. The second storage controller 510 may periodically access the disk mailbox 512 to determine whether the coredump process 532 has completed. For example, responsive to the second storage controller 510 reading the coredump process complete indication 550 from the disk mailbox 512, the second storage controller 510 may obtain ownership of the first storage device 514 to extract the coredump data 536 for diagnosing the failure 530.

Figure 6:
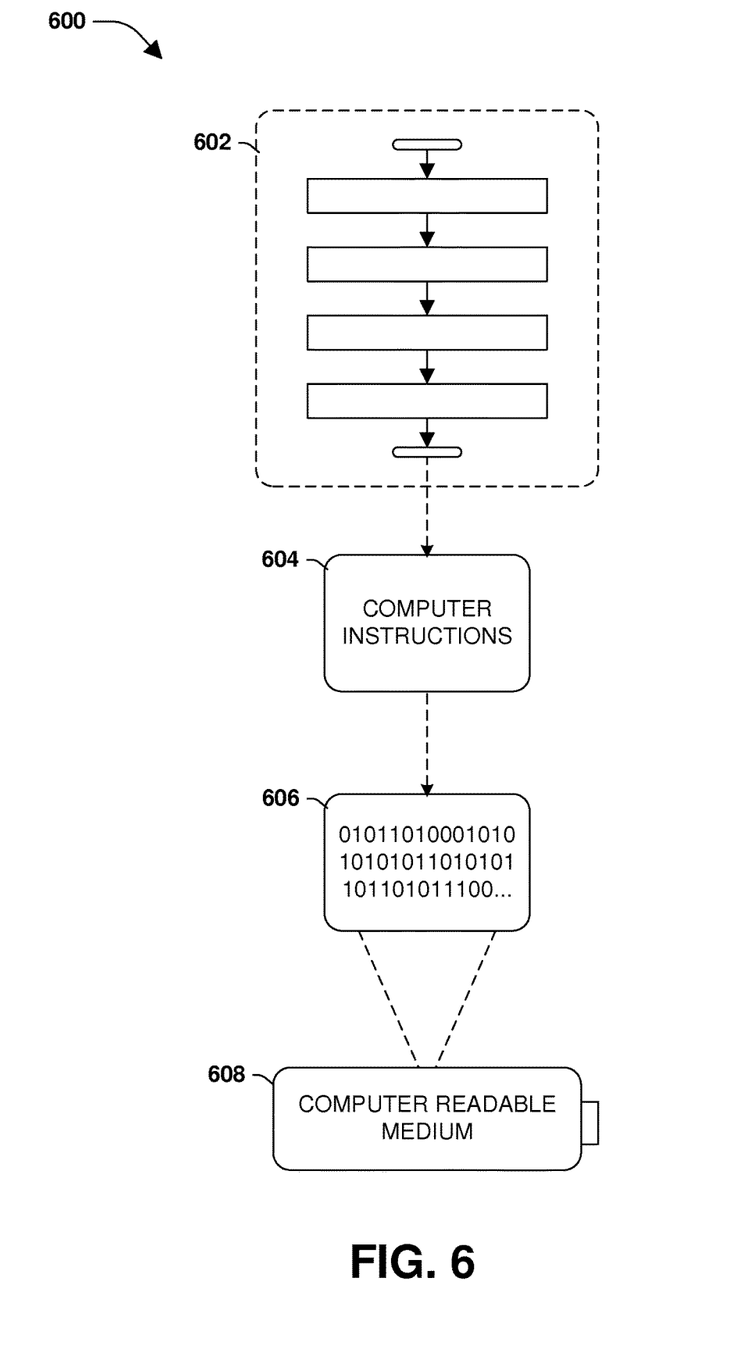
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3 and/or at least some of the exemplary method 400 of FIG. 4, for example. In some embodiments, the processor-executable instructions 604 are configured to implement a system, such as at least some of the exemplary system 500 of FIGS. 5A-5D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
specifying that a first computing device of a first storage cluster is to perform a coredump process to dump memory content of the first computing device into a first storage device upon a failure of the first computing device;
instructing the first computing device to store, based upon implementation of the coredump process, a storage device identifier of the first storage device within a disk mailbox owned by the first computing device and accessible to a second computing device of a second storage cluster;
performing a read operation to the disk mailbox to obtain the storage device identifier based upon the second computing device determining that the first computing device is experiencing the failure;
performing a second read operation to the disk mailbox to determine whether the coredump process is complete;
providing an indication that the first computing device is to maintain ownership of the first storage device for subsequent diagnosis of coredump data after recovery of the first computing device based upon a threshold number of read operations indicating that the coredump process is not complete; and
implementing a switchover operation of one or more storage devices, owned by the first computing device, to the second computing device, the switchover operation implemented to exclude the first storage device based upon the storage device identifier indicating that the first storage device is used for the coredump process.

2. The method of claim 1, wherein the performing a read operation comprises:
performing a raw read operation to a second storage device comprising the disk mailbox, the raw read operation non-disruptive to the coredump process.

3. The method of claim 1, wherein the disk mailbox is hosted within a second storage device not owned by the second computing device.

4. The method of claim 1, comprising:
performing the switchover operation to provide clients with failover access to data associated with the one or more storage devices switched over to the second computing device.

5. The method of claim 1, comprising:
obtaining ownership of the first storage device to extract coredump data for diagnosing the failure based upon the second read operation indicating that the coredump process is complete.

6. The method of claim 1, the second computing device configured as a disaster recovery partner for the first computing device.

7. The method of claim 1, wherein the failure is a kernel panic.

8. The method of claim 1, comprising:
configuring the first computing device to store the storage device identifier while in single threaded mode.

9. The method of claim 1, comprising:
configuring the first computing device to store the storage device identifier without a context switch.

10. The method of claim 1, comprising:
configuring the first computing device to store the storage device identifier inline during implementation of the coredump process.

11. The method of claim 1, comprising:
performing the read operation in response to determining a lack of network interconnectivity between the first computing device and the second computing device.

12. A non-transitory machine readable medium having stored thereon instructions for performing a method comprising machine executable code which when executed by at least one machine, causes the machine to:
specify that a first computing device of a first storage cluster is to perform a coredump process to dump memory content of the first computing device into a first storage device upon a failure of the first computing device;
instruct the first computing device to store, based upon implementation of the coredump process, a storage device identifier of the first storage device within a disk mailbox owned by the first computing device and accessible to a second computing device of a second storage cluster;
perform a read operation to the disk mailbox to obtain the storage device identifier based upon the second computing device determining that the first computing device is experiencing the failure;
perform a second read operation to the disk mailbox to determine whether the coredump process is complete;
provide an indication that the first computing device is to maintain ownership of the first storage device for subsequent diagnosis of coredump data after recovery of the first computing device based upon a threshold number of read operations indicating that the coredump process is not complete; and
implement a switchover operation of one or more storage devices, owned by the first computing device, to the second computing device, the switchover operation implemented to exclude the first storage device based upon the storage device identifier indicating that the first storage device is used for the coredump process.

13. The non-transitory machine readable medium of claim 12, wherein the machine executable code causes the machine to:
instruct the first computing device to store the storage device identifier while the first computing device is in single threaded mode.

14. The non-transitory machine readable medium of claim 12, wherein the machine executable code causes the machine to:
instruct the first computing device to store the storage device identifier without a context switch.

15. The non-transitory machine readable medium of claim 12, wherein the machine executable code causes the machine to:

instruct the first computing device to store the storage device identifier inline during implementation of the coredump process.

16. The non-transitory machine readable medium of claim 12, wherein the machine executable code causes the machine to:
instruct the first computing device to store the storage device identifier of the first storage device within the disk mailbox based upon a determination of a lack of network interconnectivity between the first computing device and the second computing device.

17. The non-transitory machine readable medium of claim 12, wherein the disk mailbox is hosted within a second storage device not owned by the second computing device.

18. A computing device comprising:
a memory containing machine readable medium comprising machine executable code having stored thereon instructions for performing a method of preserving coredump data; and
a processor coupled to the memory, the processor configured to execute the machine executable code to cause the processor to:
specify that a first computing device of a first storage cluster is to perform a coredump process to dump memory content of the first computing device into a first storage device upon a failure of the first computing device;
instruct the first computing device to store, responsive to implementing the coredump process, a storage device identifier of the first storage device within a disk mailbox owned by the first computing device and accessible to a second computing device of a second storage cluster;
perform a read operation to the disk mailbox to obtain the storage device identifier based upon the second computing device determining that the first computing device is experiencing the failure;
perform a second read operation to the disk mailbox to determine whether the coredump process is complete;
provide an indication that the first computing device is to maintain ownership of the first storage device for subsequent diagnosis of coredump data after recovery of the first computing device based upon a threshold number of read operations indicating that the coredump process is not complete; and
implement a switchover operation of one or more storage devices, owned by the first computing device, to the second computing device, the switchover operation implemented to exclude the first storage device based upon the storage device identifier indicating that the first storage device is used for the coredump process.

19. The computing device of claim 18, wherein the machine executable code causes the processor to:
instruct the first computing device to store the storage device identifier while the first computing device storage controller is in single threaded mode without performing a context switch.

20. The computing device of claim 18, wherein the machine executable code causes the processor to:
instruct the first computing device to store the storage device identifier inline during implementation of the coredump process.

* * * * *

UNITED STATES PATENT AND TRADEMARK OFFICE
CERTIFICATE OF CORRECTION

PATENT NO. : 9,952,951 B2
APPLICATION NO. : 14/920275
DATED : April 24, 2018
INVENTOR(S) : Hrishikesh Keremane Page 1 of 1

It is certified that error appears in the above-identified patent and that said Letters Patent is hereby corrected as shown below:

In the Claims

Column 18, Lines 24 and 25 Claim 19: delete "storage controller"

Signed and Sealed this
Nineteenth Day of February, 2019

Andrei Iancu
*Director of the United States Patent and Trademark Office*